United States Patent [19]
Johnson et al.

[11] 3,967,304
[45] June 29, 1976

[54] MODULAR CONSTRUCTED SEQUENCING SYSTEM FOR PHOTOGRAPHIC APPARATUS

[75] Inventors: Bruce K. Johnson, Andover; David E. Van Allen, Malden, both of Mass.

[73] Assignee: Polaroid Corporation, Cambridge, Mass.

[22] Filed: Mar. 3, 1975

[21] Appl. No.: 554,778

[52] U.S. Cl. .................................. 354/83; 354/173; 354/202; 354/288
[51] Int. Cl.² .................... G03B 1/00; G03B 17/00; G03B 19/02
[58] Field of Search .............................. 354/83–86, 354/170, 171, 173, 174, 180, 202, 203, 212, 213, 215, 217, 288

[56] References Cited
UNITED STATES PATENTS

| | | |
|---|---|---|
| 3,683,771 | 8/1972 | Land .................................. 354/304 |
| 3,731,608 | 5/1973 | Shenk .................................. 354/86 |
| 3,739,701 | 6/1973 | Erlichman ............................ 354/86 |
| 3,744,388 | 7/1973 | Erlichman ............................ 354/86 |
| 3,760,701 | 9/1973 | Paglia ............................... 354/83 X |

*Primary Examiner*—Joseph F. Peters, Jr.
*Attorney, Agent, or Firm*—John S. Vale

[57] ABSTRACT

A modular subassembly for a self-developing camera that has an operating cycle which includes the exposure and processing of a film unit. The subassembly includes a molded base section having integrally formed structure for mounting components of the subassembly including a film advance device, film counter, motor and gear train. These components are retained on the base section by a molded retaining section which snaps onto the base section.

18 Claims, 11 Drawing Figures

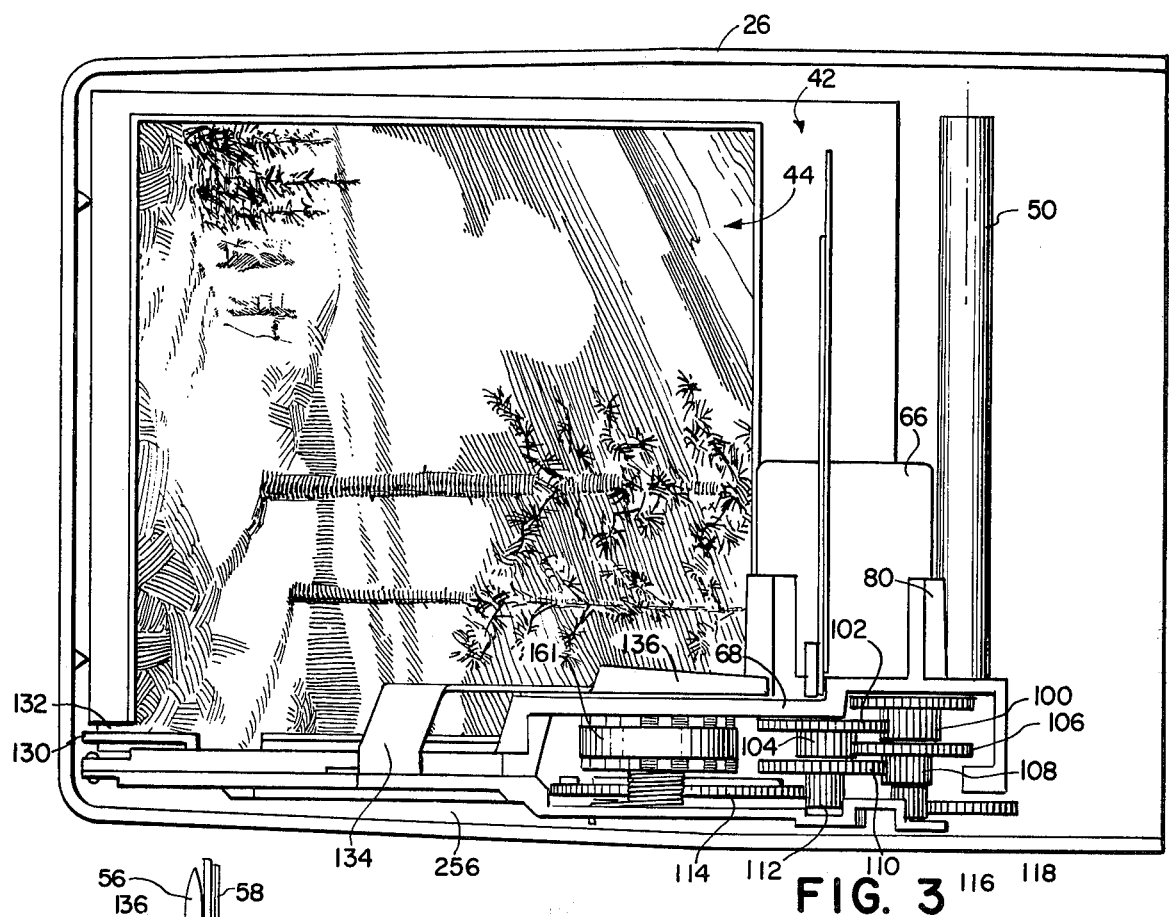
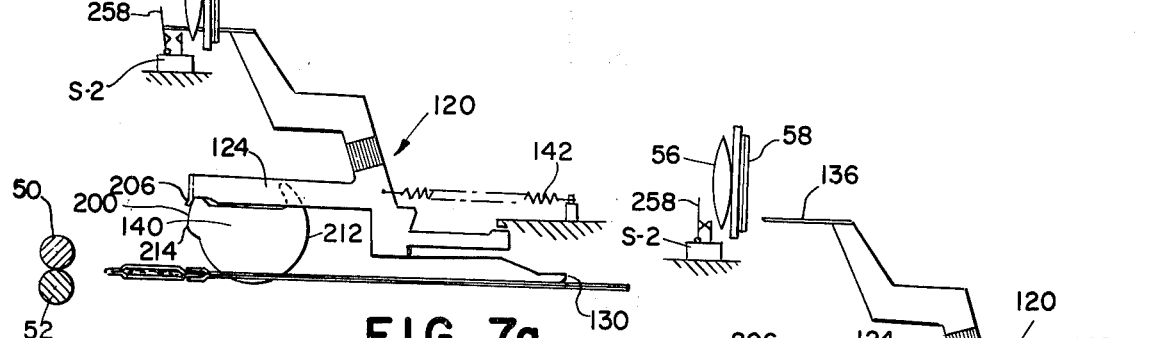
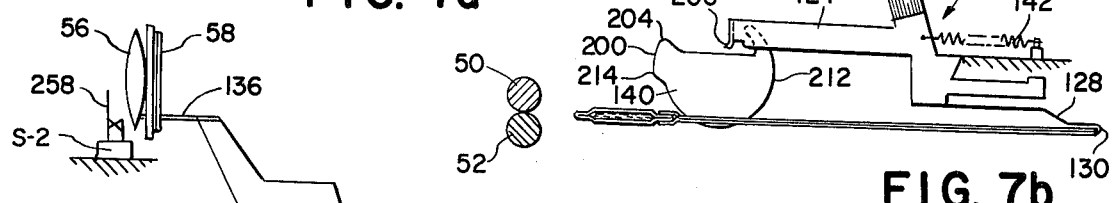
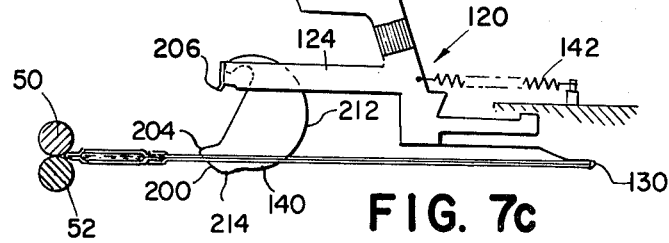
FIG. 3
FIG. 7a
FIG. 7b
FIG. 7c

MODULAR CONSTRUCTED SEQUENCING SYSTEM FOR PHOTOGRAPHIC APPARATUS

BACKGROUND OF THE INVENTION

1. Field of the Invention

The present invention relates to the field of photography and, more specifically, to photographic apparatus utilizing modular construction techniques.

2. Description of the Prior Art

The current state of the art in "one-step photographic systems" features integral or "nonpeel-apart" self-developing film units and highly-automated cameras for exposing and processing these film units.

In a typical battery-operated camera, a film container holding a plurality of self-developing film units is inserted into the camera-receiving chamber. In response to closing a film loading door, on the camera, an electrical switch is closed causing the camera to operate in a preexposure mode whereby a dark slide covering the forwardmost film unit in the container is advanced from the container and is at least partially ejected from the camera.

To take a picture, the user frames the subject with the viewfinder, focuses the objective lens, and activates a cycle-start button on the camera housing. The operating cycle includes the steps of exposing the forwardmost film unit under the control of a light-sensing exposure control circuit; advancing the exposed film unit from the film container to a processing station which includes a pair of pressure-applying rollers; transporting the film unit between the rollers to distribute a fluid processing composition between predetermined layers of the film unit; at least partially ejecting the film unit from the camera; resetting the operating mechanisms within the camera for the next cycle of operation; and terminating the operating cycle. If the camera is of the reflex-viewing type, the cycle includes the additional steps of converting the optical system from a viewing mode to an exposure mode and the subsequent reset of this subsystem.

The complete operating cycle may take as little as 1.5 seconds. However, the cycle time is not fixed because the exposure interval will vary in a dependent relationship to the intensity of scene lighting conditions. In order to coordinate the occurrence of the camera functions outlined above, some type of sequencing system is required.

The prior art is replete with cameras having operating mechanism for initiating, controlling and/or performing all or some of the enumerated functions comprising an operating cycle. Representative examples of such camera may be found in U.S. Pat. Nos. 3,683,771; 3,714,879; 3,744,388; 3,757,657; and 3,826,655.

The above disclosures describe various camera operating mechanisms mainly from a functional standpoint with little information as to a practical embodiment that is specifically designed to be easily manufactured at a low-cost and in large volumes.

SUMMARY OF THE INVENTION

The present invention provides a camera and subassembly therefor that utilize modular construction for facilitating manufacture and substantially reducing production costs.

In a preferred embodiment, the camera is of the self-developing type and includes a modular subassembly having components mounted thereon for: advancing a film unit from an exposure position to a pair of pressure-applying rollers; controlling the sequence of certain events in a cycle of camera operation; counting the number of cycles of camera operation to indicate the number of unexposed film units remaining in the camera; latching and unlatching the camera shutter mechanism; operating at least one electrical switch in a camera logic and power circuit; and driving the movable components of the subassembly as well as at least one of the pair of processing rollers.

The subassembly includes a base section, preferably of molded construction, having integrally molded structure thereon for mounting a film advance device, film counter, sequencing gear, and drive motor. A plurality of gears forming a gear train for coupling the motor to the sequencing gear and pressure-applying rollers are mounted on shafts which are designed to be press fit into integrally molded openings in the base section.

Once all of the components are mounted on the base section, a molded retaining section is connected to the base section by means of integrally molded snap-together connectors for retaining the movable components on the base section.

The subassembly has many advantages for facilitating manufacture and substantially reducing production costs. The base and retaining section, though complex in shape, are designed for molded plastic construction. Once the gear train shafts are pressed into the base section, all of the components of the subassembly may be quickly and easily mounted thereon either by hand or automatic assembly machines. The snap-together connectors facilitate the completion of the subassembly.

Most important, however, is that the subassembly may be completely assembled without having to use conventional connectors such as screws, rivets, or crimped tabs. Also, the need for time consuming joining processes, such as adhesive or thermo-bonding, has been eliminated.

Because the mounting positions for the movable and cooperating components are integrally molded into the base section, there is no need to make "factory adjustments" to the subassembly during or after assembly. Another important advantage resides in the fact that the subassembly may be pretested before it is attached to the camera.

The modular concept is carried one step further. In a preferred embodiment, the camera includes a molded component support member or frame for mounting various components and subassemblies. Once the subassembly described heretofore has been assembled and tested, it is adapted to be attached to the component support members by means of snap-together connectors that are integrally molded with the subassembly and component support member. Before the connection is made, integrally molded or formed alignment structure on the subassembly and component support member cooperate to accurately align the two structures.

Again, the attachment is made without conventional connectors or joining processes and the need for "factory adjustments" is eliminated.

Therefore, it is a primary object of the present invention to provide a low-cost and easily manufactured subassembly for a self-developing camera, the subassembly being of the type providing camera drive, film counting, sequencing, and film advance functions.

Another object is to provide such a subassembly which includes snap-together base and retaining sections of molded construction having integrally molded means thereon for mounting various individual components of the subassembly thereon.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 3 is a top elevational view of a camera shown in FIG. 1, taken along lines 3—3 showing the details of the assembly of FIG. 2 in its proper relation to other components of the camera;

FIGS. 7a, 7b, and 7c are diagrammatic illustrations of the first, second, and third operative positions of the sequencing system;

DESCRIPTION OF THE PREFERRED EMBODIMENT

Figures 1, 2:
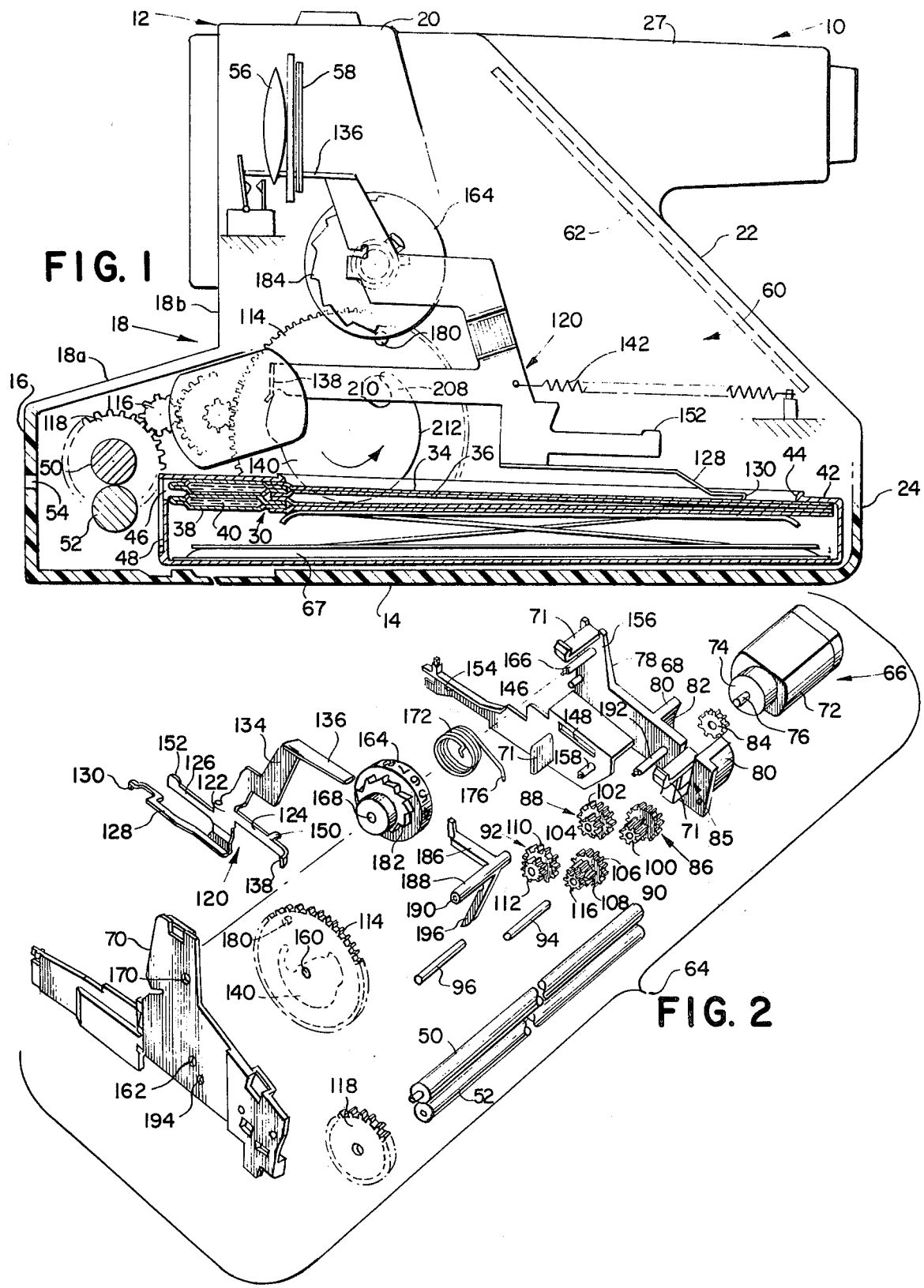
FIG. 1 is a side elevational view, partly in section, of a camera for exposing and processing self-developing film units showing the structural relation of the component parts of the camera.
FIG. 2 is a perspective view, shown in exploded fashion, of a motor driven gear train, film advancing device, and sequencing system embodying the instant invention.
Figure 4:
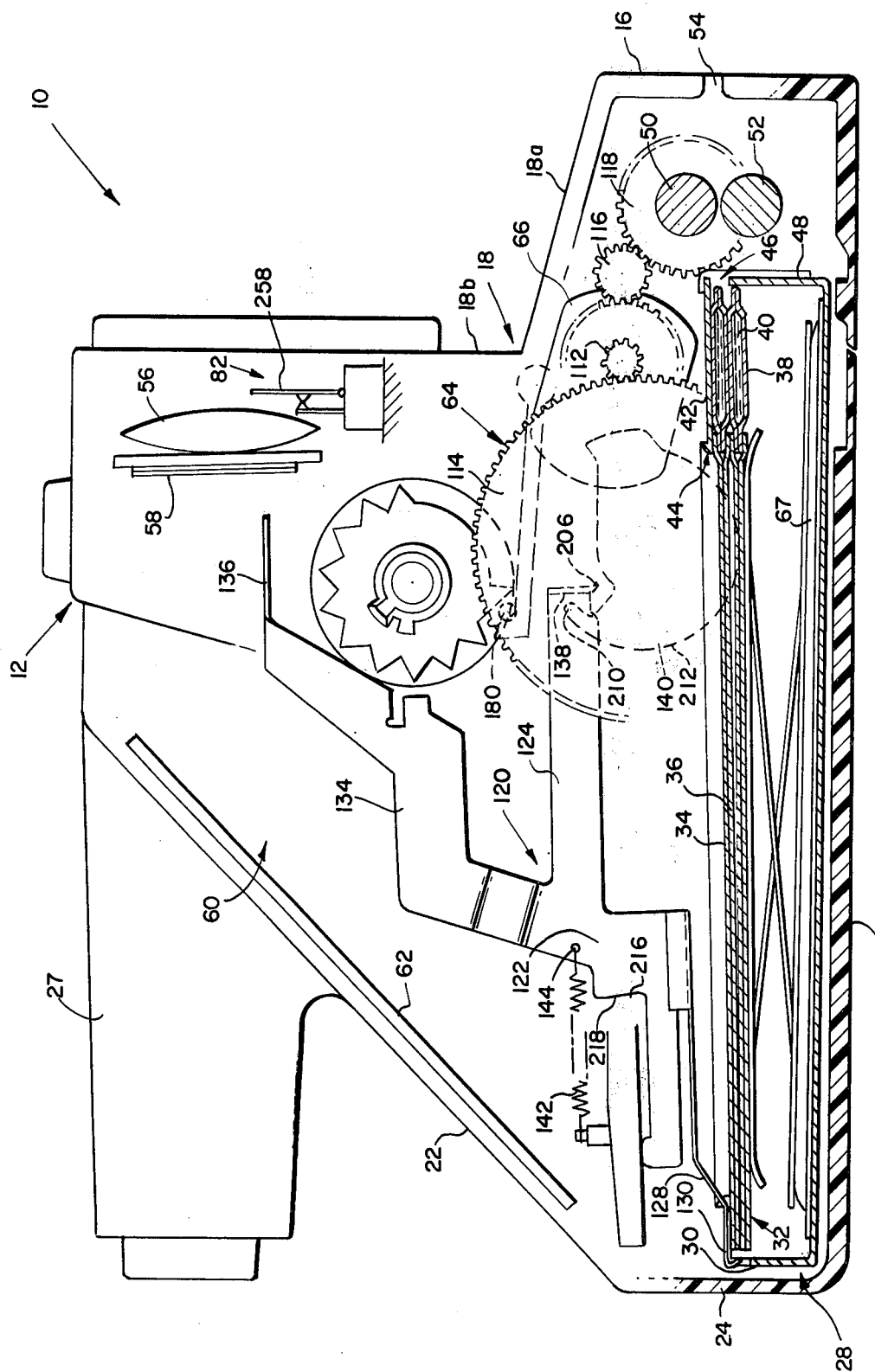
FIG. 4 is an opposite side elevational view, partly in sections, of the camera shown in FIG. 1.

FIGS. 1, 3, and 4 of the drawings show a camera 10 for exposing and processing self-developing film units. Camera 10 includes a housing 12 defined by a planar bottom wall 14, a leading end wall 16, a forward wall 18 having an incline lower section 18a and a vertical upper section 18b, a top wall 20, and inclined rear wall 22, a trailing end wall 24, and a pair of enclosing side walls 26 (See FIG. 3). The housing 12 is preferably of molded plastic construction and may include an integrally molded view finder housing 27 extending rearwardly from forward wall section 18B.

The lower portion of housing 12 includes a chamber 28 therein for receiving and supporting a film container 30 holding a plurality of self-developing film units 32 arranged in stacked relation therein.

For the ease of illustration, the film units 32 are shown to include two sheet-like elements 34 and 36 which are arranged in superposed relation, and a rupturable container 38 holding a supply of fluid processing composition 40, attached to one end of sheet-like elements 34 and 36. In reality, the film units 32 are multilayer structures which include one or more photosensitive and image-receiving layers sandwiched between a top transparent outer sheet (part of element 34) and an opaque bottom outer support sheet (part of element 36). A film unit 32 is exposed by transmitting light through the transparent outer sheet or "exposure window." Subsequent to exposure, the rupturable container 38 is subjected to a compressable pressure thereby discharging the processing fluid 40 between a predetermined pair of adjacent layers to initiate a development and diffusion transfer process. When the resultant positive image is formed, it is viewed through the same transparent top outer sheet which served as the exposure window.

The film unit 32 may be exposed and processed without having to superpose and/or separate individual sheet-like elements and it is referred to as an "integral type" self-developing film unit. It will be understood that the illustrated sheet-like elements 34 and 36 have been used to diagrammatically show a boundary separating the predetermined layers between which the processing fluid 40 is distributed.

Since film unit 32 forms no part of the instant invention, it will not be described in further detail in this disclosure. Film unit 32 is intended to represent a general class of integral type self-developing film units of which there are many species. For detailed descriptions of some of the various species, reference may be had to U.S. Pat. No. 3,415,644 issued to E. H. Land on Dec. 10, 1968 and U.S. Pat. No. 3,594,165 issued to H. G. Rogers on July 20, 1971.

The film container 30 includes a forward wall 42 having an exposure aperture 44 therein which is coextensive with the exposure window of the film unit 32. After the forwardmost film unit in container 30 has been exposed by light transmitted through aperture 44, it is advanced forwardly (to the left and right respectively as shown in FIGS. 1 and 4) through a film unit withdrawal slot 46 in a leading end wall 48 of container 30 and into the bite of a pair of juxtaposed cylindrical pressure applying rollers 50 and 52. As the film unit 32 is further advanced between rollers 50 and 52, they apply a compressive pressure which ruptures fluid container 38 thereby discharging the processing fluid 40 between the predetermined layers of film unit. A film unit 32 exits camera housing 12 through a withdrawal slot 54 in leading end wall 16 and processing fluid 40 includes an opacification system which prevents further exposure of the photosensitive layers of the film unit 32 thereby permitting the development and diffusion transfer process to take place outside of the camera housing 12.

Portions of the leading end of housing 12 may be pivotally connected in such a manner so as to allow the leading end wall 16, the leading ends of side walls 26, the leading end portion of bottom wall 14 and the rollers 50 and 52 to be pivoted downwardly thereby providing access to chamber 28 for loading and unloading a film container 30.

The film exposure means of camera 10 includes objective lens 56 mounted in camera housing forward wall section 18b and a shutter mechanism 58 (to be described in detail hereinafter) mounted behind lens 56 for regulating the transmission of image-bearing light into an exposure chamber 60 within housing 12.

Light rays passing through lens 56 travel across chamber 60 and impinge upon a reflex mirror 62 mounted at an appropriate angle on the interior surface of housing rear wall 22 for directing the light rays downwardly and through the exposure window 44 of the film container 30 to expose the forwardmost film unit at the exposure position shown in FIGS. 1, 3, and 4. Reflex mirror 62 serves a dual purpose. First it allows the optical path from lens 56 to the forwardmost film unit to be folded and thereby reducing the overall dimensions of the camera. Secondly, it provides an image reversal which is necessary when film units of the type described in the aforementioned U.S. Pat. No. 3,415,644 are utilized. It will be understood that when integral self-developing film units of the type which do not require an image reversal are utilized, camera 10 may be constructed with a straight line optical path between the lens and film unit or, in the alternative, a folded optical path may be constructed using two mirrors thereby causing no net image reversal at the camera's exposure plane.

The foregoing has been a brief general description of camera 10, film container 30, and film unit 32 to provide background information for the following detailed disclosure of a camera sequencing system. It will be understood that other camera elements such as viewfinder optics, automatic exposure control devices, interior baffles, etc. will be included in a typical camera 10 but will not be disclosed or discussed in this disclosure since they are not necessary to the understanding of the instant invention.

Camera 10 is provided with a motor-driven gear train and camera sequencing assembly shown generally at 64 in FIGS. 1, 2, 3, and 4. This assembly 64 drives the processing rollers 50 and 52; and actuates, controls and/or performs the functions of unlatching shutter 58, closing an electrical switch for latching on electrical power to an electrical circuit, advancing the exposed film unit 32 from the exposure position within the film container 30 to the bite of the processing rollers 50 and 52, indexing a film counter, and relatching the shutter 58 and reopening the electrical switch to terminate a cycle of camera operation.

FIG. 2 shows the gear train and sequencing system 64 in exploded fashion. Drive power for the system is provided by a electrical motor 66 which may be powered from an electrical battery 67 in the bottom of film container 30, through contacts and lead wires not shown, or, in the alternative, motor 66 may be powered from a separate battery pack which may be mounted within camera housing 12.

Motor 66 is preferably a high-speed DC motor which is intended to operate at a nominal speed of 12,000 rpm when connected to a DC voltage supply of approximately 6 volts.

Assembly 64 includes a pair of spaced side mounting plates 68 and 70, respectively, for mounting the component parts of the gear train, film advancing mechanism, sequencing gear, and film counter in operative relationship to one another. Mounting plates 68 and 70 are preferably formed of molded plastic to minimize the production cost of assembly 64.

In a preferred embodiment, the assembly 64 is intended to be manufactured as a self-contained modular unit which may be assembled and tested before being installed in camera 10. The modular concept is enhanced by the molded construction of mounting plates 68 and 70. As will be described later, the interior mounting plate includes integrally molded or attachable structure for mounting all of the movable component parts. After these parts are assembled in operative relation to one another, the exterior plate 70 is attached to plate 68 by means of snap-together tabs 71 thereby locking the assembled components in place.

The motor 66 is mounted on the right side (as viewed in FIG. 2) of the interior mounting plate 68. It will be noted that motor 66 includes a generally parallelepiped shaped main housing having slightly curved sidewalls 72. Extending forwardly from one end of the motor housing is a cylindrical bearing 74 for rotatably supporting the motor drive shaft 76. A major and substantially planar wall section 78 of mounting plate 68 includes a pair of integrally molded and outwardly expending motor mounting arms 80 having interior concave surfaces 82 which compliment the convex radius of the motor sidewalls 72. Although not visible in the drawing, the major sidewall section 78 includes an integrally molded open-bore bushing therein for receiving the cylindrical bearing 74 of the motor. The bushing is dimensioned such that bearing 74 may be frictionally pressed thereinto, thereby preventing lateral and longitudinal movement of the motor 66 with respect to mounting plate 68. The mounting arms 80 frictionally engage the sidewalls 72 of the motor 66 to prevent rotation of the motor housing relative to mounting plate 68. With motor 66 mounted on mounting plate 68, the motor shaft 76 extends through the bushing and is accessible on the interior side of the plate 68. A gear 84 is press fitted onto shaft 76 and serves as the first gear in the gear train. Access to the gear teeth on the circumference of gear 84 is provided by an integrally molded opening 85 is mounting plate 68.

Gear 84 is adapted to drive a cluster of four compound speed reduction gears 86, 88, 90 and 92. Gears 86 and 90 are mounted for free coaxial rotation on a shaft or pin 94 extending between the mounting plant 68 and 70. A similar shaft or pin 96 is provided behind shaft 94 for rotatably supporting gears 88 and 92. In a preferred embodiment, pins 94 and 96 are formed of a metal such as stainless steel and are press fit into appropriate opening in plates 68 and 70.

Gear 84 meshes with a large diameter section 98 of gear 86 (See FIG. 3). An intregally formed and coaxially disposed smaller diameter section 100 of gear 86 meshes with a large diameter section 102 of compound gear 88. An integrally formed and coaxially disposed smaller diameter section 104 of gear 88 meshes with a large diameter section 106 of compound gear 90 which in turn has a small diameter section 108 that meshes with a large diameter section of 110 of compound gear 92. A small diameter section 112 of gear 92 meshes with a sequencing gear or wheel 114 which will be described in detail later.

In the drawings, some of the illustrated gears do not show a complete set of teeth about the periphery of the gear. In reality, all of the gears do have a complete set of teeth unless otherwise noted.

Compound gear 90 also includes a small diameter gear section 116 extending outwardly in coaxially relation with small gear section 108. It will be noted that while small diameter section 116 has approximately the same diameter as section 108, it has fewer gear teeth around the circumference. Gear section 116 is adapted to mesh with and drive a roller gear 118 fixedly coupled to a top roller 50 in coaxial relationship therewith. Although not shown in the drawing, gear section 116 is keyed to gear section 108, by a spline and slot arrangement, for rotation therewith.

In a preferred embodiment, all of the gears and gear sections described, with the exception of gear section 116 and the roll gear 118, may be formed of synthetic material such as nylon or any other material which may be molded and is suitable for applications where the gears are subjected to relatively light loads. On the other hand, gear section 116 and roller 118 are relatively heavily loaded because their function includes driving the exposed film unit 32 between the rollers 50 and 52 along with causing the fluid bearing pod 38 to rupture and distributing the processing fluid 40 between the predetermined layers of the film unit. Therefore, gear section 116 and gear 118 are preferably formed of any suitable material appropriate for such loads, for example brass or stainless steel.

Assembly 64 also includes a reciprocating film advance member or device 120 for advancing the forwardmost film unit 32 in the film container 30 from the exposure position, through the film withdrawal slot 46, and into the bite of processing rollers 50 and 52. The main portion of film advance member 120 is preferably stamped from a thin sheet of metal such as stainless steel and includes a center support section 122 having a first arm 124 extending forwardly therefrom and a second arm 126 extending rearwardly. A third arm 128 attached to and extending rearwardly from support section 122 includes a hooked end 130 for engaging a trailing end of the forwardmost film unit 32. As the film advancing member 120 is advanced forwardly, by means to be described hereinafter, the trailing hook end 130 pulls on the trailing end of the film unit 32 to advance it through the withdrawal slot 46 and into the bite of rollers 50 and 52. Access for the film engaging hook 130 is provided by an elongated slot 132 at a trailing end corner of the film container 30 (see FIG. 3).

Extending upwardly and outwardly (towards mounting plate 68) and finally forwardly of center support section 122 is fourth arm 134 of the film advancing device 120. Extending upwardly from arm 134 is a forwardly projecting finger 136 which will be utilized to perform camera functions other than film advance, such as latching the camera shutter 58 and opening and closing an electrical switch.

The first arm 124 includes a right-angle inward bend at its free forward end thereby defining an end surface 138 which is adapted to follow a profile cam 140 formed on the interior surface of sequencing gear 114. As will be described in detail hereinafter, the combination of cam 140 and a biasing spring 142 attached to support section 122 at 144 will be utilized to determine the longitudinal disposition of the film advancing member 120 with respect to the fixed mounting plate 68 and 70 in response to the angular disposition of sequencing gear 114 relative to a predetermined starting position.

The center support section 122, the first arm 124, and the second arm 126, of film advance device 120 are configured in coplanar relation. These three elements of film advanced device 120 are adapted to slide along a planar surface 146 on the interior side of mounting plate 68. Surface 146 has a longitudinal elongated slot 148 therein for receiving an outwardly extending guide tab 150 on arm 124. The rearwardly extending arm 126 has an upwardly extending rounded surface 152 at its trailing end which follows and is guided by a longitudinal camming surface 154 extending inwardly from surface 146. When positioned on surface 146 for forward and aft sliding movement, the upper offset arm 134 and its integrally formed finger 136 are positioned on the outside of an upwardly extending section 156 of mounting plate section 78.

Mounting plate 68 includes an inwardly extending and integrally molded shaft 158 for rotatably mounting the sequencing gear 114 thereon. Shaft 158 extends through a central bore 160 of gear 114 and its end is pressfit into appropriate receiving hole 162 on mounting plate section 78. When so positioned, the cam follower surface 138 on film advance arm 124 engages the periphery of profile cam 140. In combination with biasing spring 142, cam 140 determines the longitudinal disposition of the film advancing device 120 with respect to the mounting plate 68 and 70.

In addition to the gear train and film advancing device 120, assembly 64 also includes a film counting wheel 164 having indicia thereon for visually indicating through a window in camera housing rear wall 22 (not shown), to the user how many film units 32 are left in the film pack 30. In a preferred embodiment, film container 30 includes 10 film units 32 and a covering darkslide for preventing exposure of the forwardmost film unit prior to insertion of the film container 30 in camera 10. As will be described hereinafter, the camera 10 is adapted to eject the darkslide in the same manner as a film unit 32. After a darkslide ejection, the wheel indicates the numeral 10 through the window and descends one digit per camera cycle of operation to the numeral 1.

Wheel 164 is mounted on an integrally formed shaft 166 extending inwardly from wall section 156 of mounting plate 68. Shaft 166 extends through a central bore 168 of wheel 164 and the end thereof is pressfit into a suitable opening 170 on mounting plate 70. A helical biasing spring 172 is seated in the hub section of wheel 164 having a free end 176 thereof connected to mounting plate 68. Counterwheel 164 is adapted to be indexed one numeral position (approximately 25°) in response to each cycle of camera operation. Since sequencing gear completes a single 360° revolution during each cycle of camera operation, it is preferable that gear 114 perform the indexing function.

A pin 180 on the interior surface of sequencing gear 114 (see FIG. 1) is positioned to engage a rachet wheel 182 on counter 164. The teeth of rachet wheel 182 are designed such that the pin 180 engages a particular tooth, turns the counter wheel 164 through a 25° arc, and is disengaged therefrom at the end of the 25° arc indexing segment. A rachet wheel 184 on the opposite side of counter wheel 164 is engaged by a pawl arm 186 which captures wheel 164 after each 25 degree rotation. It will be noted that spring 172 is being wound as the counter turns. The function of pawl 186 is to prevent reverse rotation of the counter 164 by spring 172 after the pin 180 on gear 114 is disengaged with the ratchet wheel 182. After the counter has been fully wound, the arm 186 is adapted to be disengaged from the ratchet wheel 184 to allow the counterwheel 164 to return to its starting position under the influence of bias spring 172.

The pawl arm 186 is preferably integrally molded with a transverse cylindrical support section 188 having an open bore 190 therein. An integrally molded shaft 192, extending inwardly from mounting plate 68, extends through bore 190 and it is pressfit into a suitable receiving hole 194 of mounting plate 70. Extending downwardly from support section 188 is a depending arm 196 which is engageable by the forward wall 42 of a film container 30 located in the operative position within camera 10. The engagement of film container 30 with arm 196 causes the pawl arm 188 to be biased upwardly (as viewed in FIG. 2) such that its end is in engagement with ratchet wheel 184. When the film container 30 is removed, the center support section 188 rotates in a counterclockwise direction (as viewed in FIG. 2) allowing the pawl arm 186 to drop out of engagement with ratchet wheel 184. In this manner, the counterwheel 164 is returned to its starting position under the influence of spring 172.

In operation, the motor 66 drives the first gear 84 in the train in a counterclockwise direction as viewed in FIG. 2. Gears 86 and 90 are thereby driven in a clockwise direction with gears 88 and 92 being driven in a counterclockwise direction.

Power for driving the top roller 52 is taken off the gear train at small diameter gear segment 116. This constitutes a first power loop of the system. Gear 116 is in turn connected to roller gear 118 thereby driving the upper roller 52 in a counterclockwise direction (as viewed in FIG. 2).

A second power loop of the gear train turns the sequencing gear 114. The power input for the second loop is taken off gear segment 108 and is transferred through gear 92 thereby turning the sequencing gear 114 in a clockwise direction as viewed in FIGS. 2 and 4.

In a preferred embodiment of the invention, the gears in the first power loop are selected such that a speed reduction of 20:1 is achieved from motor 66 to the top roller 50. The speed reduction from motor 66 to the sequencing gear 114 is preferably 150:1.

The film advance profile cam 140, on the interior surface of sequencing gear 114, is best shown in FIGS. 1 and 4 of the drawings. Cam 140 is shown in its starting or 0° position in FIGS. 1 and 7a from which it will rotate through a single 360° revolution in a counterclockwise direction (as viewed in FIG. 1) during the course of a complete cycle of camera operation.

The film advance cam follower surface 138 on the leading end of arm 124 engages and follows the periphery of portions of cam 140. Cam follower surface 138 is held in engagement with cam 140 by the rearward force applied to film advance device 120 by the biasing spring 142. As best shown in FIG. 4 of the drawings, the trailing end of spring 142 is connected to an integrally molded upstanding post 198 near the trailing end of mounting plate 68.

FIGS. 1 and 7a of the drawings shows the cam 140 on sequencing gear 114 in its 0° position with cam follower surface 138 on arm 124 engaged with a constant radius portion on dwell lobe 200 of profile cam 140. The film advance device 120 is held by lobe 200 in a first or forwardmost positon thereof relative to mounting plates 68 and 70. Because lobe 200 has a constant radius relative to the central bore 160 of sequencing gear 114, the film advancing device 120 will remain in this forwardmost position until the uppermost corner 204 of lobe 200 becomes disengaged from the lowermost corner 206 of cam follower surface 138 in response to rotating sequencing gear 114, and therefore cam 140, in a counterclockwise direction as viewed in FIG. 1.

Following the contours of profile cam 140 in a clockwise direction (as viewed in FIGS. 1, 7a, 7b, and 7c) from corner 204, the cam is cut away from a linear rearward path of travel of the lower edge 206 of cam follower surface 138 until it returns toward this path of travel to define a curved finger portion 208. Starting at the end 210 of finger 208 the outside radius thereof defines a constant radius or dwell lobe 212. The radius of lobe 212 is smaller than the radius of lobe 200 with respect to the center bore 160. The end of lobe 212 is joined to the beginning of lobe 200 by an inclined transition surface 214.

In operation, the sequencing gear 114 is rotated from the starting position in a counterclockwise direction (as viewed in FIGS. 1, 7a, 7b, and 7c) and in a clockwise direction (as viewed in FIGS. 2 and 4) for approximately 30° at which point the end 204 of lobe 200 drops below the rearward path of travel of the lower edge 206 of cam follower surface 138. Because there is no intervening cam structure in the path of travel intermediate corner 204 of lobe 200 and the end 210 of finger portion 208, the film advancing device 120 travels rearwardly (to the left as viewed in FIG. 4) under the influence of biasing spring 142 to locate the film advancing device 120 in its rearwardmost position relative to mounting plates 68 and 70. It will be noted that the rearward movement of film advance device 120 is terminated by the abutting engagement of a trailing edge 216 of center support section 122 with a forward edge 218 on mounting plate cam surface 154. This surface 218 is positioned in the path of travel of edge 216 and serves to accurately locate the rearwardmost or second position of the film advance device 120.

It will be noted that cam follower surface 138 on arm 124 does not engage the end 210 of finger 208 on profile cam 140 to stop the rearward movement of film advance device 120. As will be explained later, it is important to accurately determine the rearwardmost position of film advancing device 120 because it is in this position that the hooked end 130 is located in position to engage the trailing edge of the forwardmost film unit in film container 30. Therefore, it is desirable that the rearwardmost position be fixed by the static surface 218 on mounting plate 68 rather than the rotating end 210 of finger portion 208.

When film advancing device 120 has reached the rearwardmost position (see FIGS. 4 and 7b of the drawings), the end 210 of finger portion 208 is positioned behind (to the left as viewed in FIG. 4) cam follower surface 138.

Approximately 20 more degrees of rotation is required before the end 210 of finger 208 is engaged with the mid-portion of cam follower surface 138. The finger end 210 remains in contact with cam follower surface 138 during the next approximately 85° of rotation thus driving the film advance device 120 forwardly (to the right as viewed in FIG. 4) to the third or intermediate position of the film advance device 120 as shown in FIG. 7c thereby advancing the film unit 32 into the bite of rollers 50 and 52. This intermediate position is approximately 0.100 of an inch to the rear of the forwardmost position of device 120.

At the intermediate position, the end 210 of finger portion 208 passes below the path of travel of the lower edge 206 of cam follower surface 138 and the cam follower surface 138 rides along the constant radius dwell lobe 212 of cam 140. The length of lobe 212 is such that film advance device 120 is maintained at the intermediate position for approximately the next 200° of counterclockwise rotation of cam 140 which the film unit 32 is advanced through rollers 50 and 52.

During the last approximately 15° of cam rotation, the cam follower surface 138 is engaged by the inclined transition surface 214 which moves the film advance device 120 forwardly from the intermediate position to the forwardmost position thereby returning the cam follower surface 138 to its initial position in engagement with lobe 200 of cam 140.

As noted earlier, one of the auxiliary functions performed by the film advanced device 120 is to latch and unlatch shutter 58. In a preferred embodiment of the invention, shutter 58 is of the reciprocating blade type diagrammatically illustrated in FIG. 5 of the drawings. This is a front view of the shutter 58 looking at it from a position just behind objective lens 56.

Figure 5:
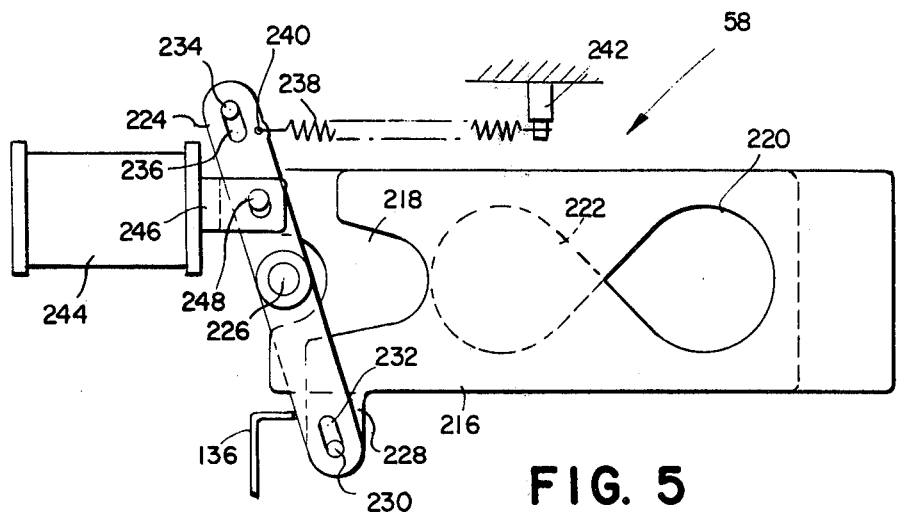
FIG. 5 is a diagrammatic illustration of a reciprocating blade shutter that is adapted to be latched by a portion of the film advancing device.

Shutter 58 comprises a pair of thin elongated shutter blades 216 and 218 mounted in a guide track (not shown) in superposed relation for linear reciprocating movement relative to each other in opposite directions. The forward blade 216 has a generally pear-shaped opening 220 therein that is adapted to be brought into and out of registration with a mirror image teardrop shaped opening 222 in the rear blade 218. FIG. 5 shows the shutter 58 in its light blocking configuration wherein there is no overlapping relationship of openings 220 and 222.

In operation, the forward blade 216 moves to the left and the rear blade 218 moves to the right (as viewed in FIG. 5) establishing an overlap of the openings 220 and 222 which defines an aperture through which light rays transmitted from lens 56 may pass to impinge upon mirror 62. It will be noted that the size of the aperture created by the openings 220 and 222 increases as a function of the relative movement of blades 216 and 218 because of the teardrop shape of openings 220 and 222.

Blades 216 and 218 are adapted to move, relative to one another, at a uniform rate. The movement from the light-blocking configuration of FIG. 5 towards the unblocking position is relatively slow so that the size of the taking aperture increases at a fairly slow rate. Movement of the blade in the opposite direction is fairly rapid to sharply and efficiently terminate the exposure cycle. In high level ambient light conditions, the opening movement is of short duration and therefore the exposure is executed at a fairly small average taking aperture. Under low level ambient lighting conditions, the opening movement of the blades takes place over a longer period of time and thus exposure is made under a correspondingly larger average aperature opening.

In a preferred embodiment of the camera 10, an automatic exposure control circuit which includes a photocell senses the ambient lighting conditions and controls the duration of blade movement toward the unblocking position by means of integrating circuits that are well known in the photographic art.

The blades 216 and 218 are moved by a walking beam or link 224 which is pivoted for rotational movement about pin 226. The lower portion 228 of forward blade 216 is pivotally coupled to walking beam 224 by means of a pin 230 which rides in elongated slot 232 near the lower end of beam 224. The rear blade 218 is similarly coupled to beam 224 by a pin 234 which rides in the elongated slot 236 near the upper end of beam 224.

As beam 224 is pivoted about pivot point 226 in a clockwise direction (as viewed in FIG. 5), the forward blade 216 moves towards the left and the rear blade 218 moves towards the right thereby bringing openings 220 and 222 into their overlapping and unblocking configuration. Pivotal movement of beam 224 in the opposite direction returns blades 216 and 218 to the light-blocking position shown in FIG. 5.

Since camera 10 is of the nonreflex viewing type, the shutter blades 216 and 218 are adapted to be in their light-blocking position at the beginning and end of a cycle of camera operation. Beam 224 is spring biased for clockwise rotational movement by a spring 238 having one end 240 attached to the upper end of beam 224 and its opposite end 242 fixedly attached to a shutter mounting plate (not shown) in camera housing 12. Counterclockwise rotation of beam 224 is accomplished by means of an electrically operated solenoid 244 which has its plunger 246 pivotally connected to beam 224 at pivot 248 above beam center pivot 226. Solenoid 224 is shown in its unenergized state.

As beam 224 is rotated in a clockwise direction by spring 238, solenoid plunger 246 is partially withdrawn from the solenoid housing. Upon an appropriate signal from the automatic exposure control circuit, solenoid 244 is energized thereby causing the plunger 246 to be retracted into the solenoid housing which in turn pivots beam 224 in a counterclockwise direction against the bias of spring 238 to move the blades 216 and 218 to their light-blocking position.

In order to maintain blades 216 and 218 in their light-blocking position shown in FIG. 5, without having solenoid 224 in its energy consuming energized state, it is necessary to provide some sort of latching mechanism to hold walking beam 224 in the light-blocking position shown in FIG. 5. In a preferred embodiment of the present invention, the means for latching and unlatching shutter 58 comprise the forwardly extending finger 136 of the film advance device 120. As will be explained later in detail, the forward end of finger 136 is adapted to extend through a plane containing the rotational path of travel of the lower end of beam 224 when the film advance device is in its forwardmost position.

As shown in FIGS. 3 and 5, the forward end of finger 136 provides a rearwardly movable stop, in the path of travel, against which the lower end of beam 24 abuts to prevent clockwise rotation of beam 224 under the influence of biasing spring 238. In response to rotating sequencing gear 114 and cam 140 through the 0° to 30° segment of rotation from the predetermined starting position, the film advance device 120 moves rearwardly under the influence of biasing spring 142. This rearward movement retracts finger 136 from the path of travel of the lower end of beam 224 thereby permitting rotation of the beam about its pivot 226 towards the shutter open position. During the course of the cycle of camera operation, film advance device 120 moves forwardly to its intermediate position wherein the forward end of finger 136 extends through the plane of rotation of beam 224 to relatch shutter 58 thereby allowing the solenoid 244 to be de-energized.

The illustrated shutter 58 is but one example of a two-bladed shutter that may be latched by finger 136. For example of another type of shutter that may be used in an alternative embodiment of the present invention, reference may be had to copending application Ser. No. 554,925 filed on even date herewith.

Figure 6:
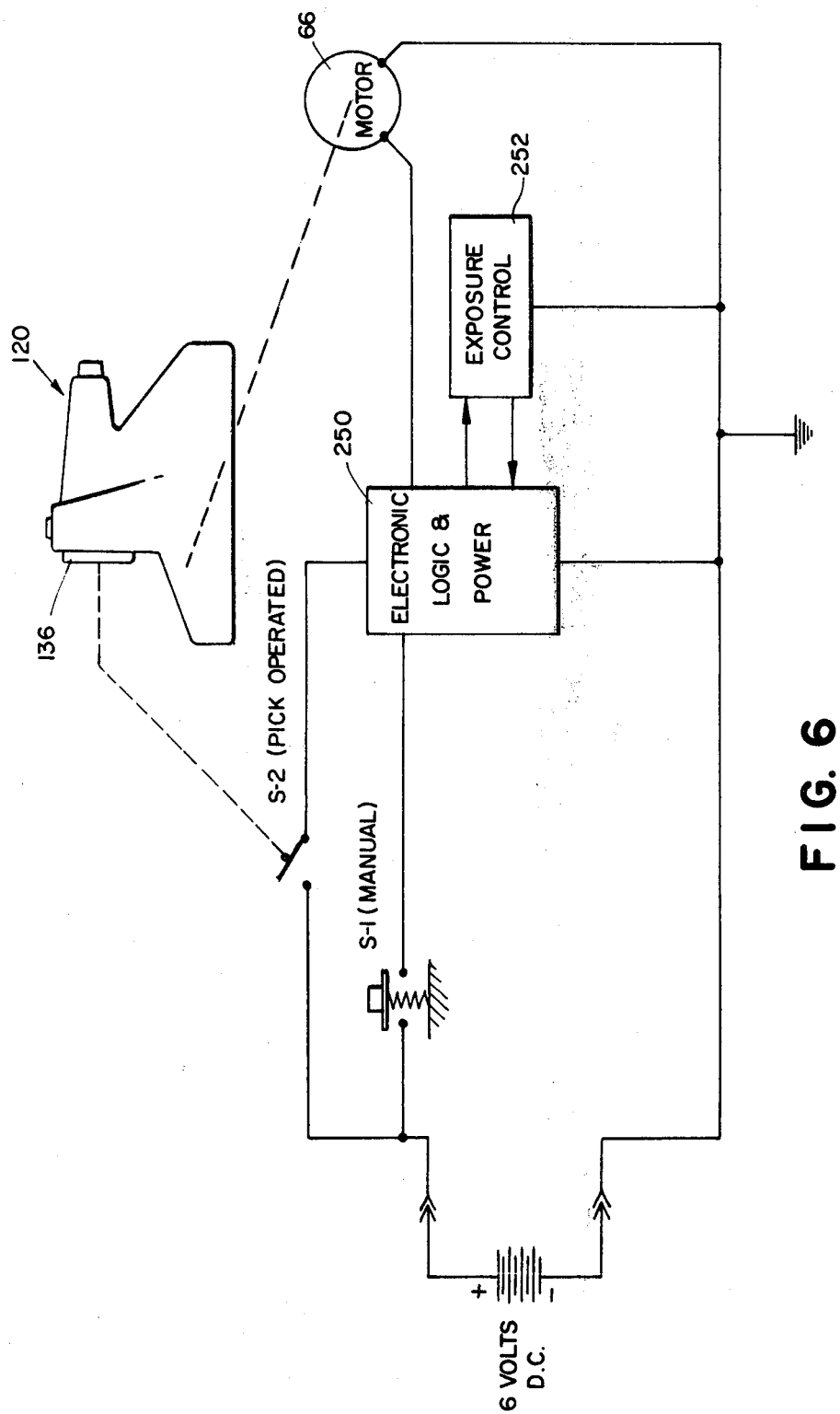
FIG. 6 is a simplified diagrammatic illustration of the camera's electrical circuit.

In addition to latching and unlatching shutter 58 and advancing the film unit 32 from the exposure position into the bite of the rollers 50 and 52, the film advance device 120 is also configured to perform the additional function of operating an electrical switch (S-2) shown in a simplified electronic circuit diagram in FIG. 6 of the drawings. The illustrated circuit is basically a switching, logic, and power system for controlling and integrating the operation of certain subsystems in camera 10.

The heart of the electronic control system is a logic and power circuit or module 250 which may be connected to the six-volt battery when either or both of parallel switches S-1 and S-2 are closed. Logic and power circuit 250 in turn controls the operation of motor 66 and an exposure control circuit 252 which operates and controls the shutter 58.

In a preferred embodiment of the invention, switch S-2 is spring biased to be normally closed to locate it in an electrically conducting state but is held in the open position, or nonconducting state, by the forwardly extending finger 136 of film advance device 120 when device 120 is located in its first or forwardmost position. As noted earlier, finger 136 also latches the shutter 58 in its light-blocking or closed position when film advance device 120 is in the forwardmost position.

To initiate a cycle of camera operation, the user depresses the normally opened and parallel connected start switch S-1 which connects the battery 62 to the logic and power circuit 250. Circuit 250 provides power to motor 66 which drives the gear train causing sequencing gear 114 to rotate from the predetermined starting position. At the end of the first 30° of rotation of sequencing gear 114, the film advance device 120 moves rapidly from its forwardmost position to its rearwardmost position as described earlier. The rearward movement of the film advance device 120 causes finger 136 to become disengaged from switch S-2 which thereby moves to its closed position. Also, the same rearward movement unlatches shutter 58.

The closing of S-2 serves several functions. First, it latches the power onto logic and power circuit 250 thereby allowing the manual start switch S-1 to be opened by the user taking his finger off S-1 without having a power interruption to circuit 250 for the balance of a cycle of camera operation. Should the user inadvertently release S-1 prior to the sequencing gear 114 completing the first 30° of rotation, the cycle of camera operation will shut down because the power latching switch S-2 will not be moved to its normally closed position by the rearward movement of film advance device 120. In this instance, the user merely depresses switch S-1 again which will continue the interrupted rotation of sequencing gear 114 until the first angular segment of rotation (30°) is completed.

The second function performed by the closing of switch S-2 is to provide an input pulse to circuit 250 which initiates the operation of exposure control circuit 252 and electronically breaks the rotation and disconnects power from motor 66. The exposure control circuit 252 includes a photocell subcircuit which measures and integrates ambient scene lighting conditions. As the light integration is going on, shutter 58 is opening under the influence of bias and spring 238. When the integrating circuit reaches a predetermined level, exposure control circuit 252 energizes the solenoid 244 to close shutter 58 and terminate the exposure portion of cycle.

The time required for completion of the exposure phase of the camera cycle of operation will, of course, depend upon the scene lighting conditions. At the termination of the exposure phase, control circuit 252 provides a logic input signal to logic and power circuit 250 which thereby initiates and controls the film processing cycle. Circuit 250 once again energizes motor 66 to drive the processing rollers and to continue the single revolution of sequencing gear 114 from the 30° position to its 360° or 0° position.

Rotation of sequencing gear 114 causes the film advance device 120 to be advanced forwardly to the intermediate position thereby feeding the forwardmost film unit 32 into the bite of the rotating rollers 50 and 52 and relatching shutter 58. As the film unit 32 is advanced between the roller to discharge and distribute the film processing fluid 40 between predetermined layers of the film unit 32, the film advance device 120 is maintained at its intermediate position by profile cam 140. At the completion of the film processing mode of operation, cam 140 advances the film advancing device 120 from the intermediate position to its forwardmost position thereby causing the forwardly extending finger 136 to open the normally closed switch S-2. The opening of S-2 disconnects a logic and power circuit 250 from the battery thereby terminating the camera cycle of operation.

It will be noted that just prior to the termination of the cycle, logic and power circuit 250 provides an electronic breaking signal to motor 66 to stop the rotation of sequencing gear 114 at its 360° or 0° position. Circuit 250 also preferably includes a timing subcircuit for terminating the rotation of motor 66 at the end of the camera cycle of operation even if the user fails to manually release S-1 after switch S-2 closes and latches on the power. Therefore the circuit 250 is capable of providing an electronic shutdown of the camera operating cycle should switch S-1 be maintained in the closed position for a time period exceeding that required to cycle the camera through a complete operating cycle.

Figure 8:
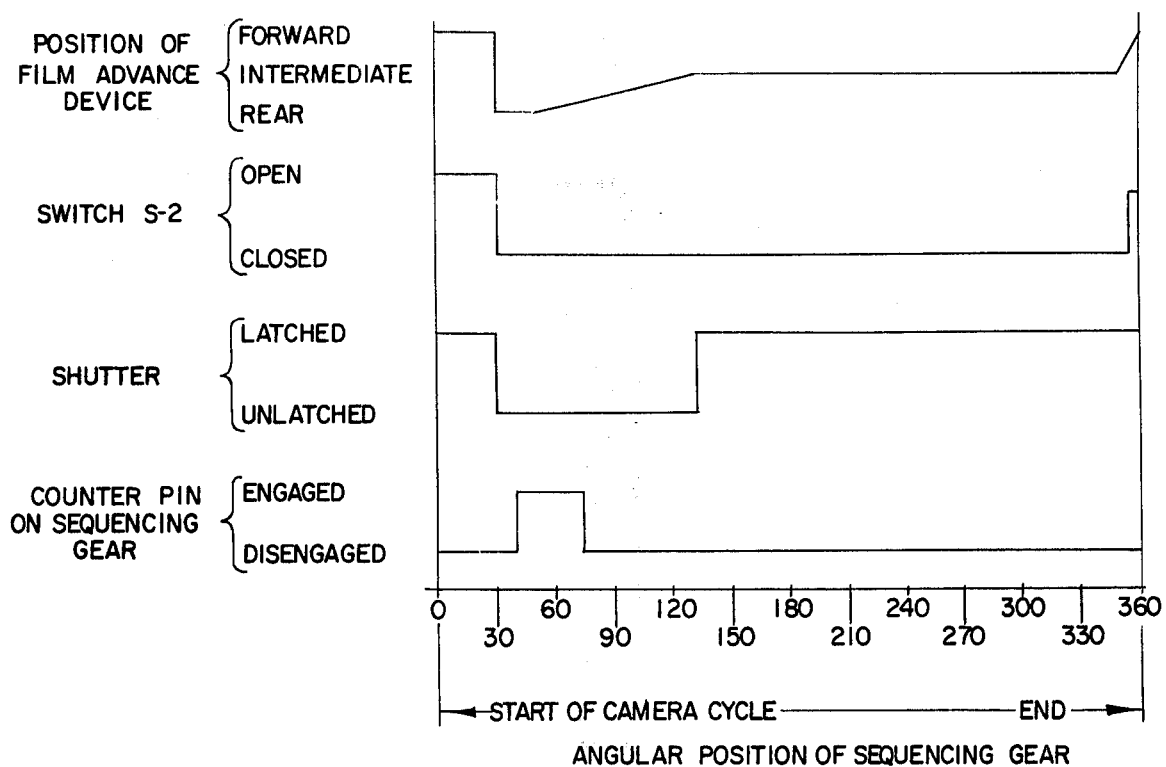
FIG. 8 is a graph showing the status of various camera components versus the angular displacement of the sequencing gear to illustrate the sequence of camera events or functions during the course of a single 360° revolution of the sequencing gear.

The circuit diagram shown in FIG. 8 has been provided to illustrate one embodiment of an electronic control system which utilizes a power latching switch S-2 which open or closed state is determined by the position of film advance device 120. It will be understood that there are many variations of circuits 250 and 252 which may be utilized performing functions outlined.

As best shown in FIG. 3 of the drawings, the motor gear train, counter and sequencing gear assembly 64 is located and mounted in a longitudinal channel 256 (on the right side of the camera as viewed in FIG. 3) which is defined by the right exterior wall 26 of camera housing 12 and the right sidewall of a film container 30 located at the exposure position.

Assembly 64 is positioned in channel 256 such that the motor 66 extends inwardly therefrom to assume a position overlying the leading end of the forward wall 42 of film container 30 intermediate the leading end wall 48 thereof and the leading edge of the film exposure aperture 44.

As noted earlier in the disclosure, the leading end of camera housing 12 which encloses the processing rollers 50 and 52 and the roller drive gear 118 may be configured to pivot downwardly (as viewed in FIG. 1 of the drawings) to provide access to the film receiving chamber 28. In this type of embodiment, the rollers 50 and 52 are suitably mounted on the leading end section of housing 12 by a mounting bracket (not shown). When the leading end section of housing 12 is pivoted up to its operative closed position, the roller gear 118 is aligned and meshes with the roller drive gear 116.

In the disclosed embodiment, only the top roller 50 is driven to advance the film unit 32 therebetween. It will be understood that it is within the scope of the present invention to provide a coaxially disposed smaller diameter gear section on roller gear 118 which would mesh with another gear fixedly attached to the end of the lower roller 52. By means of this arrangement, both the upper and lower rollers 50 and 52 would be rotatably driven in opposite rotational directions to cause the film unit 32 to be advanced therebetween.

In FIGS. 1 and 7a of the drawings, the sequencing gear 114 is shown in its 0° starting position thereby locating the film advance device 120 in its first or forwardmost position. The forwardly extending finger 136 of device 120 extends through the path of travel of the shutter walking beam 224 thereby latching the shutter 58 in its light-blocking unclosed position. Also, the forward end of finger 136 engages and deflects a spring arm 258 of switch S-2 causing the contacts of switch S-2 to be spaced apart so that the switch is in an electrically open, nonconducting position. S-2 is mounted in camera housing 12 such that the spring arm 258 is in the path of travel of finger 136.

In operation, the user frames his subject and focuses objective lens 56. He then presses camera start button S-1 which may be conveniently mounted on camera housing forward wall section 18b although it is not shown in the drawings. The following cycle of operation will be described by making reference to FIGS. 1, 4, 7a, 7b, 7c, and 8 of the drawings. FIG. 8 is a graphical presentation of camera functions which are actuated, controlled or performed by the single revolution sequencing gear 114.

Just prior to the user actuating switch S-1 the sequencing gear 114 is at the 0° position; film advance device 120 is in its forwardmost position; switch S-2 is in the electrically open condition; shutter 58 is latched, and the counterwheel actuating pin 180 or gear 114 is out of engagement with any tooth on the indexing ratchet wheel 182 of counter 164. The presence of the film container 30 in camera receiving chamber 28 causes the pawl arm 186 to be pivoted into engagement with the counter ratchet wheel 184.

Upon the closing of the normally opened start switch S-1, motor 66 is energized thereby rotatably driving at least the top roller 50 and the camera sequencing gear 114. Gear 114 rotates through a first 30° angular segment of the single 360° revolution causing the film advance device 120 to move rapidly, in a direction opposite of the direction of film advancement from the exposure position to the processing station, to its rearwardmost position under the influence of biasing spring 142 (see FIGS. 4 and 7b). The retraction of finger 136 closes switch S-2 and unlatches the shutter 58 which begins to open under the influence of the shutter biasing spring 238.

At the end of the initial 30° rotation, a counter actuating pin 180 on gear 114 is still not in engagement with the indexing ratchet wheel 182.

The closing of S-2 initiates the exposure phase and terminates the rotation of motor 66 thereby stopping the sequencing gear 114.

During the exposure phase, the blades 216 and 218 of shutter 58 move relative to one another in opposite directions to cause the creation of an expanding light transmitting aperture behind lens 56. The camera sequencing assembly 64 is de-activated during the exposure interval because its duration is variable. With shutter 58 open, light rays from lens 56 impinge upon the inclined mirror 62 from where they are reflected onto the forwardmost film unit to cause exposure thereof. The exposure cycle is automatically terminated by the photocell circuit which triggers the energizing of the solenoid 244. At this point the logic and power circuit 250 re-energized motor 66 causing sequencing gear 114 to resume its rotation. After approximately the first 10° of resumed rotation, the counterpin 180 becomes engaged with the ratchet wheel 182. During the next 10° of rotation, the end 210 of profile cam finger 208 engages the cam follower surface 138 of film device 120.

Up to this point in the camera cycle of operation, the single revolution sequencing gear 114 has rotated through an arc segment of approximately 50° from its 0° starting position.

The counterpin 180 remains in engagement with the counterwheel 164 for approximately 35° of rotation of sequencing gear 114 therby causing a 25° rotation of counter 164. By the time the sequencing gear 114 has gone through 75° of rotation, from the starting position the pin 180 becomes disengaged from the counter 164.

Beginning at the 50° of rotation position, the finger 210 of profile cam 140 drives the film advance member 120 forwardly from its rearwardmost position shown in FIG. 7b to the intermediate position shown in FIG. 7c for the approximately next 85° of rotation. When the film advance device 120 reaches the intermediate position, the sequencing gear 114 has undergone a total rotation of approximately 135° from the initial starting position and the film unit enters the bite of rollers 50 and 52 and shutter 58 is relatched by finger 136. Film advance device 120 is maintained at the intermediate position for approximately the next 200° of rotation of gear 114 while the film unit is advanced through rollers 50 and 52. At this point cam follower surface 138 engages the transition surface 214 of cam 140. During the next approximately 15° of rotation, the film advance device 120 is moved from its intermediate position to the forwardmost position to open switch S-2.

The illustrated and described embodiment of the sequencing system is intended to provide a vehicle for disclosing the inventive concepts of the present invention. It will be understood that certain changes may be made in the system to vary the sequence of events of a cycle of camera operation or to apply the system to camera designs that are at variance with the design described herein without exceeding the scope of the present invention.

For example, finger 136 relatches the shutter 58 when the film advance device 120 is moved forwardly to the intermediate position. This allows the solenoid 244 to be de-energized while the film unit 32 is being advanced between rollers 50 and 52 thereby reducing the drain on the battery 62 when the highest load is on motor 66. The penalty paid for this battery saving feature is a more complex and costly logic and power circuit.

If the battery-saving feature is too costly for a particular camera design, switch S-2 may be repositioned and the finger 136 may be shortened somewhat so that the shutter is not latched at the intermediate position but rather when film advance device is moved from the intermediate position of the forwardmost position to open switch S-2.

The film advance device 120 should be thought of as a movable unitary structure which has means thereon for performing a plurality of functions in a dependent relationship to the position and/or movement of the unitary structure which in turn depends on the angular disposition of a rotating member which rotates through a single revolution during the course of a cycle of operation.

The illustrated embodiment of the unitary structure performs the functions of shutter latching and unlatching, film advance, and switch operation. In a camera which does not include any electronic circuit and is driven by a spring motor or by a hand operating device, the switch operating function may be eliminated. Obviously, the other functions may be added, such as counter indexing, by adding appropriate actuating means to the unitary structure and appropriately modifying the profile of cam 140 on sequencing gear 140 so that the various functions are initiated, controlled and-/or performed in response to rotating gear 140 through various angular segments of the single revolution.

Alternatively, it is not necessary to provide a unitary structure for performing several functions. It is within the scope of the present invention to provide separate actuators for shutter latching and/or switch operation that are operable for performing the functions outlined in a dependent relationship to the angular disposition of the sequencing gear 114. Also it should be understood that the various angular segments of the single revolution may be sequential and/or may overlap.

Modular Construction of Assembly 64

As noted earlier in the disclosure, the assembly 64 is designed for ease of manufacture and low production costs.

Returning to FIG. 2 of the drawings, the assembly 64 may be thought of as including a molded base section or side mounting plate 68 having integrally molded means thereon for mounting or receiving means for mounting the plurality of individual components of the assembly. The other side mounting plate 70 may be thought of as a retaining section or retaining means for retaining the individual components on base section 68.

Base section 68 includes: the integrally molded arms 80 for mounting motor 66; integrally molded holes for receiving the gear mounting shafts 94 and 96; the integrally molded shaft 166 for rotatably mounting counter wheel 164; the integrally molded shaft 192 for pivotally mounting the counter pawl member 188; the integrally molded slot 148 and camming surface 154 for mounting and guiding the film advance device 120; the integrally molded post 198 for anchoring one end of spring 154; and the integrally molded snap connector members 71. The retaining section 70 included integrally molded openings for receiving the free ends of the plurality of mounting shafts and three openings 260 for receiving the snap-together members 71 on base section 68.

The design of assembly 64 facilitates high speed automated or semiautomated manufacturing techniques. The plurality of movable components and gear shafts 94 and 96 may be easily and efficiently mounted on base section 68. Since the base section is molded in one piece all of the mounting locations are fixed thereby allowing the cooperating components to be mounted without having to make subsequent "factory adjustments." The mounted components are retained on base 68 by snapping on the retaining section 70. By integrally molding one part (71) of the two-part snap-together connectors on base section 68, and the other part (260) on the retaining section 70 alignment problems are eliminated.

Figure 9:
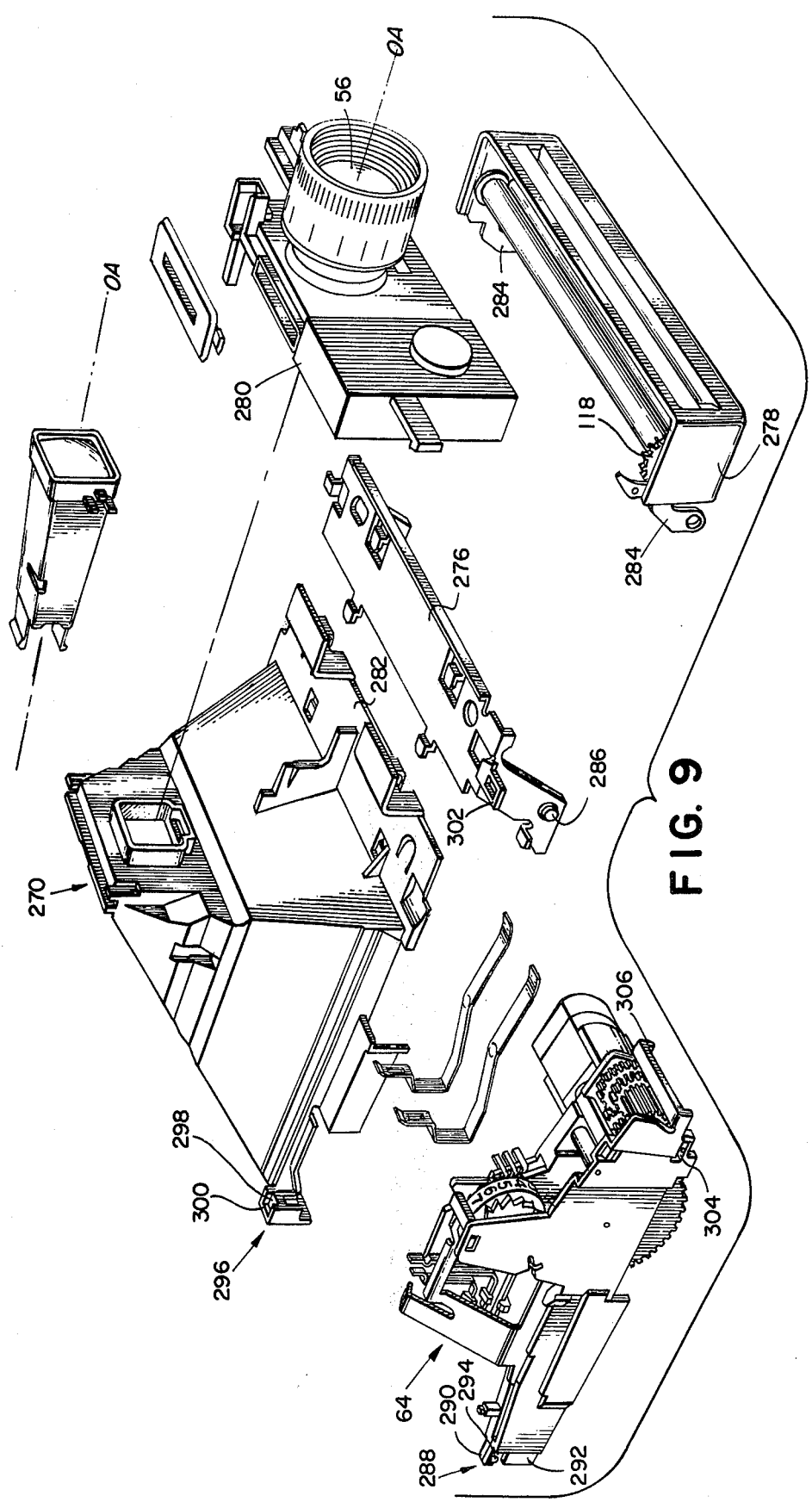
FIG. 9 is a perspective view, shown in exploded fashion, of a subassembly or component support member and various subassemblies that are adapted to be mounted thereon.

By this technique of modular construction, assembly 64 may be constructed without having to use conventional fasteners (screws, rivets, etc.) and/or conventional bonding processes (adhesive bonding or thermowelding). The assembled assembly 64 is shown in FIGS. 6 and 9 of the drawings. It will be noted that the assembly 64 shown in FIG. 9 has slight structural changes from that shown in FIG. 2 but functions in the same manner as the assembly 64 shown in FIG. 2.

Another important advantage of the modular technique is that assembly 64 may be completely pretested as a unit before it is mounted in the camera. By connecting motor 66 to a power and logic circuit 250, the assembly 64 may be cycled through simulated camera cycles to check the operation of the motor, gear train, sequencing gear, film advance device and film counter. Should any component or group of components fail to operate properly, appropriate repairs or replacements may be made simply by unsnapping the retaining plate 70 from the base section 68.

Modular Construction of Camera 10

In a preferred embodiment of the invention, the modular construction and snap-together assembly technique is carried one step further.

As best shown in FIG. 9 of the drawings, various subassemblies (including assembly 64) are adapted to be mounted on a subassembly or component support member 270. After mounting, the assembled unit may be tested before it is inserted into camera housing 12.

In a preferred embodiment, component support member 270 is a unitary structure of molded plastic construction having a hollow core which defines the exposure chamber 60 within camera 10. In addition to mounting assembly 64, the component support member 270 mounts: the mirror 62; a roller assembly mounting bracket 276 for receiving and supporting a roller assembly 278; and a lens and shutter assembly 280 including lens 56 and shutter 58. Each of these components or subassemblies is adapted to snap onto member 270 thereby eliminating the need for conventional fasterners and/or bonding techniques.

Once bracket 276 is snapped onto the leading end of member 270 (below a forwardly extending horizontal surface 282 thereof) assembly 64 may be snapped into place along one side if member 270. Thus members 270 and 276 may be thought of as the means mounting assembly 64.

Since this disclosure is directed to the mounting of assembly 64, the other subassemblies or components will not be described in further detail. For those desiring more information on this subject, reference may be had to a copending application, Ser. No. 554,769 filed on even date herewith.

It is particularly important that assembly 64 be accurately mounted and aligned on the component support means so that the hooked end 130 of film advance device 120 is in position to engage the trailing end of a film unit 32 located in position for exposure and the roller drive gear 116 of assembly 64 is in position to mesh with the roller gear 118 on the roller assembly 278. As shown in FIG. 9 roller assembly 278 includes a pair of bracket arms 284 which snap onto a pair of studs 286 on bracket 276 for pivotally mounting roller assembly 276 thereon. As noted earlier, the roller assembly 276 may be pivoted downwardly to provide access to the film receiving chamber 28 of camera 10. In a preferred embodiment gears 116 and 118 have sharply pointed gear teeth to facilitate intermeshing when the roller assembly is pivoted to its operative position.

As best shown in FIG. 9 of the drawings, the base section 68 of assembly 64 includes an integrally molded fork like connector 288 at the trailing end thereof, comprising an upper horizontal member 290 and a lower vertical member 292 separated from member 290 by means of a longitudinal slot 294. The component support member 270 includes an integrally molded training end section 296 for receiving, mounting and aligning the trailing end of assembly 64. Section 296 includes a horizontal plate 298 that is surrounded on three sides by upstanding walls 300. The trailing end 288 of assembly 64 slips into the open side of section 296 such that the member 190 on assembly 64 seats on the top surface of plate 298 and the leading edge of plate 298 slides into slot 294.

The roller hanger bracket 296 includes an outwardly extending tab 302 thereon which is adapted to extend through a rectangular slot 304 at the leading end of retaining section 70 of assembly 64.

It should be noted that alignment of assembly 64 with respect to support member 270 and bracket 276 is accomplished by the integrally molded structure 288 at the trailing end and the opening 304 at the leading end of assembly 64. Also, the gears 116 and 118 are aligned and correctly positioned because both the tab connector 304 and roller assembly mounting stud 286 are precisely positioned on the roller bracket 276. With assembly 64 accurately positioned on members 270 and 276 an integrally molded and inwardly extending snap connector or finger 306 on retaining plate 70 (see FIG. 9) snaps into an appropriate opening (not shown) on member 282 to latch assembly 64 in its operative position. For a more detailed description of the mounting of assembly 64, reference may be had to copending application, Ser. No. 554,769 filed on even date herewith.

Since certain changes may be made in the above system and apparatus without departing from the scope of the invention herein involved, it is intended that all matter contained in the above description or shown in the accompanying drawings shall be interpreted as illustrative and not in a limiting sense.

What is claimed is:

1. A modular subassembly for use in a self-developing camera of the type having an operating cycle during which a film unit is exposed at an exposure position and is then advanced between a pair of pressure applying rollers for distributing a fluid processing composition within the film unit, said subassembly comprising:

a base section;

film advance means movable relative to said base for engaging a film unit at the exposure position and advancing the film unit to the pressure applying rollers of the camera;

means on said base section for mounting and guiding said film advance means thereon for movement along a predetermined path of travel relative to said base section;

film counting means having indicia thereon for counting and visually displaying the number of cycles of camera operation said counter means being adapted to be rotatably mounted on said base section such that it may be indexed one indica for each cycle of camera operation;

means on said base section for rotatably mounting said film counter means;

sequencing means, including a rotatable sequencing gear, for controlling the sequence of certain events in a cycle of camera operation including moving and positioning said film advance means along said predetermined path of travel and indexing said film counting means, said sequencing gear being configured to rotate through a single 360° revolution during the course of a cycle of camera operation such that said film advance and counting means are operated thereby in a relationship that is dependent upon the angular disposition of said sequencing gear relative to a predetermined starting position;

means on said base section for rotatably mounting said sequencing gear thereon in operative relation with said film advance and counting means;

a motor including a drive shaft having a drive gear thereon for providing power for rotating said sequencing gear and at least one of the pair of camera rollers having a drive gear thereon to cause a film unit to be advanced between the rollers;

means on said base section for receiving and supporting said motor thereon;

a gear train including a plurality of gears adapted to be interconnected for coupling said motor drive gear in a driving relation to said sequencing gear and the drive gear on the one roller;

means on said base section for rotatably mounting said plurality of gears in operative relation with each other, said sequencing gear, said motor drive gear and the roller drive gear;

a retaining section adapted to be connected to said base section for retaining said film advance means, said film counting means, said sequencing gear, and said gear train in proper operative relation with one another intermediate said base and retaining sections; and connecting means, for connecting said base and said retaining section, said connecting means including at least one two-part connector of the snap-together type, one of said two parts being on said base section and the other of said two parts being on said retaining section such that said base section and retaining section may be snapped together after said film advance means, film counting means, sequencing gear and gear train have been mounted on said base section.

2. A modular subassembly as defined in claim 1 wherein said base and retaining sections of said support means are of molded construction and said means for mounting said film advance means, said film counting means, said sequencing gear, said motor, and said one part of said two-part coupling are integrally molded with said base section and said other part of said two-part coupling is integrally molded with said retaining section.

3. A modular subassembly as defined in claim 2 wherein said integrally molded means for mounting said film counting means and said sequencing gear include a film counting means shaft and a sequencing gear shaft integrally molded with said base sections and extending outwardly towards said retaining section, said retaining section having integrally molded openings therein positioned and configured thereon for receiving the free ends of said film counting means shaft and sequencing gear shaft.

4. A modular subassembly as defined in claim 2 wherein said means for mounting said gear train include two gear mounting shafts configured to extend between said base and retaining sections in parallel relation to one another aand said base and retaining sections include integrally molded openings for receiving the ends of said two mounting shafts.

5. A modular subassembly as defined in claim 2, wherein said film counting means includes a counting wheel having an indexing ratchet gear on one side thereof and a position retaining ratchet gear on the opposite side thereof and said sequencing gear further includes a pin thereon for engaging said indexing ratchet gear to turn said counting wheel one indicia in response to rotating said sequencing gear through said single revolution and said subassembly further includes a pawl for engaging said position retaining ratchet gear to retain said wheel in position subsequent to indexing, said pawl being configured to be mounted between said base and retaining sections and said base section having an integrally molded shaft thereon for mounting said pawl for pivotal motion about said shaft.

6. A subassembly as defined in claim 2 wherein said motor includes a housing having convex sidewalls and an annular drive shaft bearing extending outwardly from one end of said motor housing and said means for mounting said motor include an integrally molded opening in said base section into which said annular bearing may be inserted in frictional engagement therewith and a pair of outwardly extending arms having interior convave surfaces conforming to the convex side walls of said motor housing for engaging said convex side walls to prevent rotation of said motor housing relative to said base section about the axis of said drive shaft.

7. A subassembly as defined in claim 2 wherein said film advance means is configured for reciprocating motion along said predetermined path and includes a guide tab thereon and said means for mounting said film advance means includes an elongated slot integrally molded in said base section, extending thereon in a direction that is parallel to said predetermined path for receiving said tab to support said film advance means on said base section and guide said film advance means along said predetermined path.

8. A modular subassembly as defined in claim 7 wherein said film advance means is configured for movement between first and second positions along said predetermined path for locating said film advance means in position to engage a film unit located at the exposure position and for advancing the film unit therefrom to the pair of rollers when said film advance means is moved from said second position to said first position, and said base section further includes integrally molded stop means located at one end of said predetermined path of travel for stopping and accurately locating said film advance means in said second position.

9. A modular subassembly as defined in claim 2 wherein said sequencing gear includes a profile cam thereon for selectively engaging and moving said film advance means in the direction of film advancement from the exposure position to the rollers and said subassembly further includes a spring providing a biasing force on said film advance means to move said film advance means in a direction opposite film advancement, said spring being attached at one end to said film advance means and said base section further including integrally molded means thereon to which the opposite end of said spring may be attached to provide said biasing force on said film advance means.

10. A subassembly as defined in claim 1 wherein said gear train is configured to provide a speed reduction of approximately 20:1 between said motor and the at least one pressure apply roller and a speed reduction of approximately 150:1 between said motor and said sequencing gear.

11. A subassembly as defined in claim 1 wherein said subassembly support means is adapted to be attached to the camera by means of a two-part connector of the snap-together type and said subassembly support means further includes one part of such a two-part connector thereon such that said subassembly support means may be connected to the other part of said connector on the camera.

12. A subassembly as defined in claim 11 wherein said subassembly support means is of molded construction and said one part of said two-part connector is integrally molded with said retaining section of said subassembly support means.

13. A subassembly as defined in claim 12 further including integrally molded means on said support means for accurately aligning said support means with the exposure position and rollers of the camera.

14. A modular subassembly for use in a camera of the self-developing type including a pair of fluid spreading rollers and means for locating a film unit in position for exposure and having a cycle of operation including the exposure and processing of the film unit, said subassembly comprising the following components in combination:

a first mounting member;
second mounting member;
a motor;
film advance means for displacing the film unit from its exposure position into another position wherein a leading edge of the film unit is disposed between the rollers;
a gear adapted to be coupled in driving relationship with at least one of the rollers when said modular assembly is operably positioned within the camera;
means on one of said mounting members for mounting said motor;
means on at least one of said mounting members for displaceably mounting said film advance means;
means on one of said mounting members for rotatably mounting said gear;
means mounted on one of said mounting members for driving said gear and said film advance means from said motor; and
means for connecting said mounting members together, said mounting members serving to mount said recited components comprising said subassembly as a self--supporting integral module when so connected together.

15. The subassembly of claim 14 wherein said film advance means includes a displaceable member configured to selectively engage the trailing edge of the film unit, at least one of said mounting members defines an elongated guide track for said displaceable member and said mounting members, when connected together, serve to retain at least a portion of said displaceable member therebetween and in said guide track.

16. The subassembly of claim 14 wherein said connecting means consists of complementary snap-fit connections formed on said mounting members.

17. The subassembly of claim 15 wherein said driving means additionally comprises a sequencing wheel and means for rotatably mounting said sequencing wheel on one of said retaining members in operative relationship with said displaceable member.

18. The subassembly of claim 17 wherein each of said retaining members is a unitary molded plastic structure and said means for mounting said motor, said means for mounting said gear, and said means for mounting said sequencing wheel comprise molded portions of one of said retaining members, said retaining members serving to retain said gear, said sequencing wheel, and said displaceable member therebetween when said retaining members are connected together by said connecting means.

* * * * *